US011259222B2

(12) United States Patent
Yu et al.

(10) Patent No.: US 11,259,222 B2
(45) Date of Patent: Feb. 22, 2022

(54) MOBILE TERMINAL AND METHOD AND SYSTEM FOR SWITCHING AND CONTROLLING CALL LINK OF MOBILE TERMINAL

(71) Applicant: TCL COMMUNICATIONS (NINGBO) CO., LTD., Ningbo (CN)

(72) Inventors: Bin Yu, Ningbo (CN); Weiqin Yang, Ningbo (CN)

(73) Assignee: TCL COMMUNICATIONS (NINGBO) CO., LTD., Ningbo (CN)

( * ) Notice: Subject to any disclaimer, the term of this patent is extended or adjusted under 35 U.S.C. 154(b) by 219 days.

(21) Appl. No.: 16/495,702

(22) PCT Filed: Mar. 19, 2018

(86) PCT No.: PCT/CN2018/079469
§ 371 (c)(1),
(2) Date: Nov. 15, 2019

(87) PCT Pub. No.: WO2018/171553
PCT Pub. Date: Sep. 27, 2018

(65) Prior Publication Data
US 2020/0100149 A1    Mar. 26, 2020

(30) Foreign Application Priority Data

Mar. 20, 2017 (CN) .......................... 201710166839.6

(51) Int. Cl.
*H04W 36/00* (2009.01)
*H04L 5/00* (2006.01)
(Continued)

(52) U.S. Cl.
CPC ....... *H04W 36/0083* (2013.01); *H04L 5/0078* (2013.01); *H04W 4/16* (2013.01);
(Continued)

(58) Field of Classification Search
None
See application file for complete search history.

(56) References Cited

U.S. PATENT DOCUMENTS 6,400,695 B1    6/2002  Chuah et al.
6,611,514 B1*   8/2003  Moulsley ............ H04W 74/002
                                            370/348
(Continued)

FOREIGN PATENT DOCUMENTS

CN    2141950 Y    9/1993
CN    1464756 A   12/2003
(Continued)

OTHER PUBLICATIONS

ZTE, ZTE Microelectronics, Sensing based schemes for cross-link interference mitigation in NR, symposium, Jan. 20, 2017, all pages, 3GPP TSG RAN WG1 AH_NR#1 Meeting, Washington.
(Continued)

*Primary Examiner* — Mohammad S Adhami
(74) *Attorney, Agent, or Firm* — Kirton McConkie; Evan R. Witt (57) ABSTRACT

A mobile terminal-based call link switching and control method, comprising: a mobile terminal monitoring a network time slot occupancy; when the network time slot occupancy is lower than a preset threshold, dividing a preset number of time slots in the network and labeling same as first time slots, and labeling the remaining time slots as second time slots; and when performing data communication in the network, allocating one specialized time slot from the first time slots to be used only for the present communication, and when the present communication finishes, releasing the time slot.

10 Claims, 2 Drawing Sheets

(51) Int. Cl.
*H04W 4/16* (2009.01)
*H04W 36/22* (2009.01)
*H04W 72/04* (2009.01)
*H04W 72/12* (2009.01)

(52) U.S. Cl.
CPC ........ *H04W 36/0011* (2013.01); *H04W 36/22* (2013.01); *H04W 72/0446* (2013.01); *H04W 72/1205* (2013.01)

(56) References Cited

U.S. PATENT DOCUMENTS

| | | | |
|---|---|---|---|
| 7,050,407 B1* | 5/2006 | Frazer | H04W 72/087 370/329 |
| 7,386,315 B2 | 6/2008 | Fattouch | |
| 7,616,746 B2 | 11/2009 | O'Neill | |
| 8,406,205 B2 | 3/2013 | Rajamani | |
| 9,036,612 B2 | 5/2015 | Gidlund | |
| 9,204,310 B2 | 12/2015 | Ju et al. | |
| 2004/0028018 A1 | 2/2004 | Cain | |
| 2004/0110509 A1 | 6/2004 | Fattouch | |
| 2007/0086474 A1* | 4/2007 | Lee | H04L 5/0064 370/447 |
| 2009/0040984 A1 | 2/2009 | Rajamani | |
| 2013/0183997 A1 | 7/2013 | Ju et al. | |
| 2017/0359827 A1* | 12/2017 | Kim | H04L 1/1887 |

FOREIGN PATENT DOCUMENTS

| | | |
|---|---|---|
| CN | 1489402 A | 4/2004 |
| CN | 1496071 A | 5/2004 |
| CN | 101061701 A | 10/2007 |
| CN | 101247327 A | 8/2008 |
| CN | 101815320 A | 8/2010 |
| CN | 101938750 A | 1/2011 |
| CN | 102076091 A | 5/2011 |
| CN | 102217395 A | 10/2011 |
| CN | 103096490 A | 5/2013 |
| CN | 106982112 A | 7/2017 |
| EP | 0994634 A2 | 4/2000 |
| EP | 2141950 A1 | 1/2010 |
| EP | 2413649 A1 | 2/2012 |
| JP | 2003008531 A | 1/2003 |

OTHER PUBLICATIONS

Shim J-J et al; A New MAC Protocol Using AWRR/DT in Broadband Wireless Networks : Novel Contention Methods; IEICE Transactions on Fundamentals of Electronics Communications and Computer Sciences, Engineering Sciences Society, Tokyo, JP; vol. E85-A, No. 6, Jun. 1, 2002, pp. 1308-1319.

* cited by examiner

MOBILE TERMINAL AND METHOD AND SYSTEM FOR SWITCHING AND CONTROLLING CALL LINK OF MOBILE TERMINAL

CROSS REFERENCE TO RELATED APPLICATIONS

This application is a National Stage of International Application No. PCT/CN2018/079469, filed on Mar. 19, 2018, which claims the priority of Chinese Patent Application No. 201710166839.6, entitled "METHOD AND SYSTEM FOR SWITCHING AND CONTROLLING CALL LINK OF MOBILE TERMINAL", filed on Mar. 20, 2017 in the CNIPA (National Intellectual Property Administration, PRC), the disclosure of which is incorporated herein by reference in its entirety.

TECHNICAL FIELD

The present disclosure relates to a mobile terminal technology field, and more particularly to a method and a system for switching and controlling a call link based on a mobile terminal and the mobile terminal.

BACKGROUND

Although functions of mobile terminals are increasingly complex, a phone call is still one of the most basic functions. In the prior art, a bandwidth of an operator based on calls of data services in some idle periods (e.g., before dawn every day) or in some areas (e.g., remote areas) is usually idle. Network calls based on the data services refer to that voice data packages transmitted from one side are routed and forwarded to the other side via a network and usually delayed. In some idle periods (e.g., before dawn every day) or in some areas (e.g., remote areas), calls are usually very important, and time delay should be decreased or canceled. That is, time slots of communication between two sides are not fixed. The data packages transmitted from one side are routed and forwarded to the other side via the network and usually delayed. In the prior art, network use efficiency is low, and the network calls using the data services are usually delayed and not convenient for the user.

SUMMARY OF DISCLOSURE

The present disclosure provides a method and a system for switching and controlling a call link based on a mobile terminal and the mobile terminal capable of increasing network use efficiency when the occupancy rate of the network is not high. The delay of a network call using data services can be reduced to provide convenience for a user.

In a first aspect, an embodiment of the present disclosure provides a mobile terminal including at least one processor and at least one memory. The at least one memory is configured to store instructions and data, and the at least one processor is configured to execute the steps of:

monitoring an occupancy rate of time slots in a network by the mobile terminal;

monitoring an occupancy rate of time slots in a network by the mobile terminal;

assigning one of the first time slots as a dedicated time slot which is only used for data communication when the data communication proceeds; releasing the one of the first time slots when the data communication ends.

In the mobile terminal, after the step of assigning the one of the first time slots as the dedicated time slot which is only used for the data communication when the data communication proceeds and the step of releasing the one of the first time slots when the data communication ends, the at least one processor is configured to execute the step of: monitoring the occupancy rate of the time slots in the network continually; when the occupancy rate of the time slots is greater than or equal to the predetermined threshold, the time slots which are marked as the first time slots and occupied are correspondingly processed as follows:

duplicating data in the time slots which are marked as the first time slots and occupied into the second time slots for communication; and releasing the first time slots and marking the same as the second time slots after 2 seconds after the step of duplicating the data in the time slots which are marked as the first time slots and occupied into the second time slots for communication is performed.

In the mobile terminal, the step of monitoring the occupancy rate of the time slots in the network by the mobile terminal includes: setting up a timer; acquiring the time slot or slots X which have been used every 0.1 seconds; acquiring a total number Y of the time slots; and calculating the occupancy rate X/Y of the time slots in the network.

In the mobile terminal, the step of marking the predetermined number of the time slots as the first time slots and marking the rest of the time slots as second time slots when the occupancy rate of the time slots is lower than a predetermined threshold includes:

determining whether the occupancy rate of the time slots in the network is lower than the predetermined threshold; and marking the predetermined number of the time slots as the first time slots, and marking the rest of the time slots as the second time slots.

In the mobile terminal, the predetermined threshold is 20%.

In the mobile terminal, the predetermined number of the time slots are 20% of a total number of the time slots.

In a second aspect, an embodiment of the present disclosure provides a method for switching and controlling a call link based on a mobile terminal, including:

monitoring an occupancy rate of time slots in a network by the mobile terminal;

marking a predetermined number of the time slots as first time slots and marking the rest of the time slots as second time slots, when the occupancy rate of the time slots is lower than a predetermined threshold; and assigning one of the first time slots as a dedicated time slot which is only used for data communication when the data communication proceeds; releasing the one of the first time slots when the data communication ends.

In the method for switching and controlling the call link based on the mobile terminal, after the step of assigning the one of the first time slots as the dedicated time slot which is only used for the data communication when the data communication proceeds and the step of releasing the one of the first time slots when the data communication ends, the method further comprises the step of: monitoring the occupancy rate of the time slots in the network continually; when the occupancy rate of the time slots is greater than or equal to the predetermined threshold, the time slots which are marked as the first time slots and occupied are correspondingly processed as follows:

duplicating data in the time slots which are marked as the first time slots and occupied into the second time slots for communication; and releasing the first time slots and marking the same as the second time slots after 2 seconds after the step of duplicating the data in the time slots which are marked as the first time slots and occupied into the second time slots for communication is performed.

In the method for switching and controlling the call link based on the mobile terminal, the step of monitoring the occupancy rate of the time slots in the network by the mobile terminal includes: setting up a timer; acquiring the time slot or slots X which have been used every 0.1 seconds; acquiring a total number Y of the time slots; and calculating the occupancy rate X/Y of the time slots in the network.

In the method for switching and controlling the call link based on the mobile terminal, the step of marking the predetermined number of the time slots as the first time slots and marking the rest of the time slots as second time slots when the occupancy rate of the time slots is lower than a predetermined threshold includes:

determining whether the occupancy rate of the time slots in the network is lower than the predetermined threshold; and marking the predetermined number of the time slots as the first time slots, and marking the rest of the time slots as the second time slots.

In the method for switching and controlling the call link based on the mobile terminal, the predetermined threshold is 20%.

In the method for switching and controlling the call link based on the mobile terminal, the predetermined number of the time slots are 20% of a total number of the time slots.

In a third aspect, an embodiment of the present disclosure provides a system for switching and controlling a call link based on a mobile terminal, including at least one processor, at least one memory, and at least one program. The at least one program is stored in the at least one memory and configured to be executed by the at least one processor. The at least one program includes:

a first network time slot monitoring module configured to control the mobile terminal to monitor an occupancy rate of time slots in a network;

a time slot dividing module configured to mark a predetermined number of the time slots as first time slots and to mark the rest of the time slots as second time slots when the occupancy rate of the time slots is lower than a predetermined threshold; and a time slot allocating module configured to assign one of the first time slots as a dedicated time slot which is only used for data communication when the data communication proceeds and configured to release the one of the first time slots when the data communication ends.

The system for switching and controlling the call link based on the mobile terminal further includes:

a second network time slot monitoring module configured to continually monitor the occupancy rate of the time slots in the network; when the occupancy rate of the time slots is greater than or equal to the predetermined threshold, the second network time slot monitoring module is configured to process the time slots which are marked as the first time slots and occupied as follows:

duplicating data in the time slots which are marked as the first time slots and occupied into the second time slots for communication; and releasing the first time slots and marking the same as the second time slots after 2 seconds after the step of duplicating the data in the time slots which are marked as the first time slots and occupied into the second time slots for communication is performed.

In the system for switching and controlling the call link based on the mobile terminal, the first network time slot monitoring module includes:

a setting and acquiring unit configured to set up a timer, to acquire the time slot or slots X which have been used every 0.1 seconds, to acquire a total number Y of the time slots, and to calculate the occupancy rate X/Y of the time slots in the network, wherein the predetermined threshold is 20%, and the predetermined number of the time slots are 20% of the total number of the time slots.

In the system for switching and controlling the call link based on the mobile terminal, wherein the time slot dividing module includes:

a determining unit configured to determine whether the occupancy rate of the time slots in the network is lower than the predetermined threshold; and a diving unit configured to mark the predetermined number of the time slots as the first time slots and to mark the rest of the time slots as the second time slots.

The mobile terminal and the method and the system for switching and controlling the call link based on the mobile terminal provided by the present disclosure monitor the occupancy rate of the time slots in the network. When the occupancy rate of the time slots is lower than the predetermined threshold, the predetermined number of the time slots are marked as the first time slots and the rest of the time slots are marked as the second time slots. When the data communication proceeds, one of the first time slots is assigned as a dedicated time slot which is only used for the data communication. When the data communication ends, the one of the first time slots is released. Accordingly, when the occupancy rate of the network is not high, network use efficiency can be increased. The delay of a network call using data services can be reduced to provide convenience for a user.

DETAILED DESCRIPTION OF EMBODIMENTS

To make the objectives, technical schemes, and technical effects of the present disclosure more clearly and definitely, the present disclosure will be described in details below by using embodiments in conjunction with the appending drawings. It should be understood that the specific embodiments described herein are merely for explaining the present disclosure but not intended to limit the present disclosure.

Figure 1:
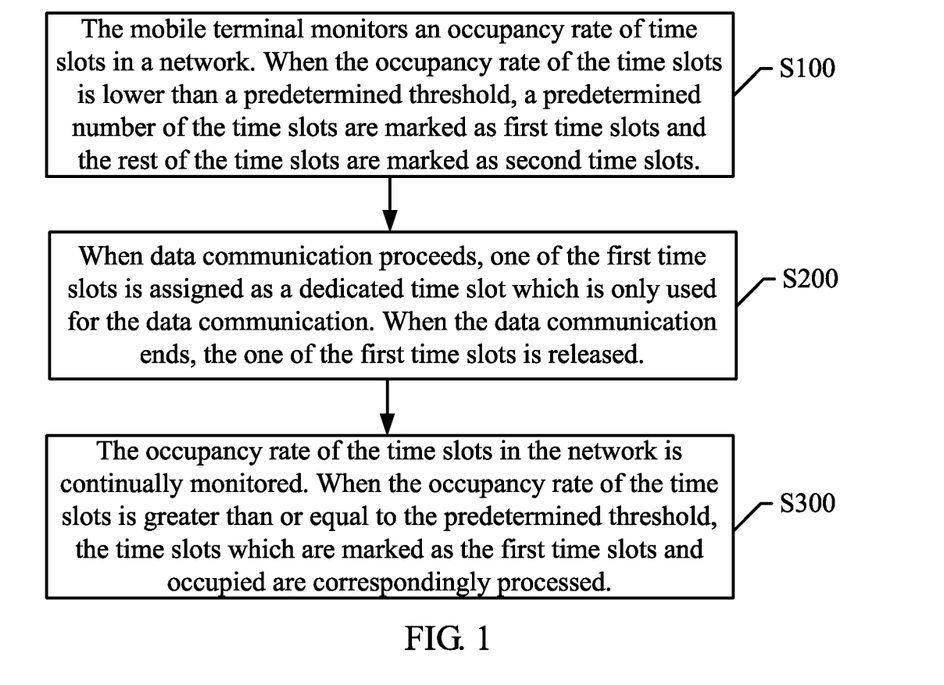
FIG. 1 illustrates a flow chart of a method for switching and controlling a call link based on a mobile terminal in accordance with a preferred embodiment of the present disclosure.

Please refer to FIG. 1. FIG. 1 illustrates a flow chart of a method for switching and controlling a call link based on a mobile terminal in accordance with a preferred embodiment of the present disclosure. The method for switching and controlling the call link based on the mobile terminal of the present disclosure includes the following steps.

In step S100, the mobile terminal monitors an occupancy rate of time slots in a network. When the occupancy rate of the time slots is lower than a predetermined threshold, a predetermined number of the time slots are marked as first time slots and the rest of the time slots are marked as second time slots.

In the embodiment of the present disclosure, the first time slots include time slots which are being used. For example, the network includes 10 time slots from time slot 1 to time slot 10. When only time slot 5 (the fifth time slot) is being used currently and the remaining time slots are idle, the occupancy rate of the time slots in the network is 1/10 which is lower than the predetermined threshold (assuming 20%). Two of the ten time slots are marked as the first time slots and the rest of the time slots are marked as the second time slots. One of the first time slots is the time slot which is being used, and the other of the first time slots is any one of the time slots which is idle, for example, time slot 1. Preferably, the idle time slot or slots can be selected according to the sequence of the time slots from small to large, so that the number of the first time slots is enough.

In detail, step S100 includes the following steps.

A timer is set up. The time slot or slots X which have been used are acquired every 0.1 seconds, a total number Y of the time slots is acquired, and the occupancy rate X/Y of the time slots in the network is calculated.

It is determined whether the occupancy rate (X/Y) of the time slots in the network is lower than the predetermined threshold. Preferably, the predetermined threshold is 20%, that is, 20% of the total number of the time slots. When the occupancy rate of the time slots in the network is lower than the predetermined threshold, the predetermined number (preferably, 20% of the total number of the time slots) of the time slots are marked as the first time slots and the rest of the time slots are marked as the second time slots.

Furthermore, in the embodiment of the present disclosure, all of the time slots are marked as the second time slots. That is, a numeral is assigned to each of the time slots to identify that each of the time slots is the first time slot or the second time slot. At first, each of the time slots is assigned to the second time slot. When the occupancy rate of the time slots in the network is lower than the predetermined threshold, the predetermined number (preferably, 20% of the total number of the time slots) of the time slots are marked as the first time slots and the rest of the time slots are marked as the second time slots.

In step S200, when data communication proceeds, one of the first time slots is assigned as a dedicated time slot which is only used for the data communication. When the data communication ends, the one of the first time slots is released.

In detail, in the above-mentioned step S100, the time slots which are marked as the first time slots are dedicated time slot used in communication between two sides. The second time slots function as the same in the prior art. When the data communication proceeds, one of the first time slots is assigned as the dedicated time slot which is only used for the data communication. When the data communication ends, the one of the first time slots is released.

In step S300, the occupancy rate of the time slots in the network is continually monitored. When the occupancy rate of the time slots is greater than or equal to the predetermined threshold, the time slots which are marked as the first time slots and occupied are correspondingly processed.

In the present step, for example, the network includes 10 time slots from time slot 1 to time slot 10. When only time slot 5 (the fifth time slot) is being used currently and the remaining time slots are idle, the occupancy rate of the time slots in the network is 1/10 which is lower than the predetermined threshold (assuming 20%). Two (i.e., time slot 1 and time slot 5) of the ten time slots are marked as the first time slots and the rest of the time slots are marked as the second time slots. Thereafter, when the two time slots (i.e., slot 1 and slot 5) in the network are occupied, the time slots which are marked as the first time slots (i.e., slot 1 and slot 5) and occupied are correspondingly processed.

In detail, the time slots which are marked as the first time slots and occupied are correspondingly processed as follows.

In step S1, data in the time slots which are marked as the first time slots and occupied is duplicated into the second time slots for communication. That is, the data is transmitted via the first time slots which are assigned the dedicated time slots and also transmitted via the second time slots in a conventional manner.

In step S2, the first time slots are released and marked as the second time slots after 2 seconds after step S1 is performed. Herein, the link can be stable after 2 seconds, and thus the first time slots can be released.

It can be appreciated from the above that the method of the present disclosure monitors the occupancy rate of the time slots in the network. When the occupancy rate of the time slots is lower than the predetermined threshold, the predetermined number of the time slots are marked as the first time slots and the rest of the time slots are marked as the second time slots. When the data communication proceeds, one of the first time slots is assigned as a dedicated time slot which is only used for the data communication. When the data communication ends, the one of the first time slots is released.

In the present disclosure, the time slots are divided into the first time slots and the second time slots. The first time slots are dedicated time slots which are only used for the communication between sides in the network. The first time slots always retain the communication between the two sides until the communication between the two sides ends. Accordingly, the communication between the two sides can be guaranteed. When the occupancy rate of the network is not high, network use efficiency can be increased. The delay of a network call using data services can be reduced to provide convenience for a user.

Figure 2:
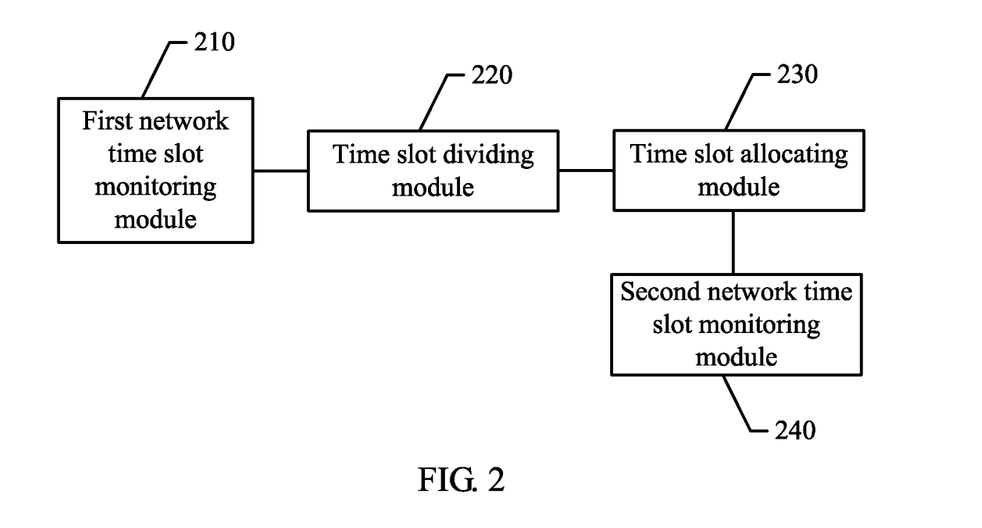
FIG. 2 illustrates a structural diagram of a system for switching and controlling a call link based on a mobile terminal in accordance with a preferred embodiment of the present disclosure.

Based on the above embodiment of the method, the present disclosure further a system for switching and controlling a call link based on a mobile terminal. As shown in FIG. 2, the system includes the following modules.

A first network time slot monitoring module 210 is configured to control the mobile terminal to monitor an occupancy rate of time slots in a network. An embodiment is described as above.

A time slot dividing module 220 is configured to mark a predetermined number of the time slots as first time slots and to mark the rest of the time slots as second time slots when the occupancy rate of the time slots is lower than a predetermined threshold. An embodiment is described as above.

A time slot allocating module 230 is configured to assign one of the first time slots as a dedicated time slot which is only used for data communication when the data communication proceeds. When the data communication ends, the one of the first time slots is released. An embodiment is described as above.

Furthermore, the system for switching and controlling the call link based on the mobile terminal further includes the following module.

A second network time slot monitoring module 240 is configured to continually monitor the occupancy rate of the time slots in the network. When the occupancy rate of the time slots is greater than or equal to the predetermined threshold, the second network time slot monitoring module 240 is configured to process the time slots which are marked as the first time slots and occupied as follows.

In C1, data in the time slots which are marked as the first time slots and occupied is duplicated into the second time slots for communication. An embodiment is described as above.

In C2, the first time slots are released and marked as the second time slots after 2 seconds after C1 is performed. An embodiment is described as above.

Preferably, in the system for switching and controlling the call link based on the mobile terminal, the first network time slot monitoring module 210 includes the following units.

A setting and acquiring unit is configured to set up a timer, to acquire the time slot or slots X which have been used every 0.1 seconds, to acquire a total number Y of the time slots, and to calculate the occupancy rate X/Y of the time slots in the network.

The predetermined threshold is 20%. The predetermined number of the time slots are 20% of the total number of the time slots.

In the system for switching and controlling the call link based on the mobile terminal, the time slot dividing module 220 includes the following units.

A determining unit is configured to determine whether the occupancy rate of the time slots in the network is lower than the predetermined threshold. An embodiment is described as above.

A diving unit is configured to mark the predetermined number of the time slots as the first time slots and to mark the rest of the time slots as the second time slots. An embodiment is described as above.

In summary, the mobile terminal and the method and the system for switching and controlling the call link based on the mobile terminal provided by the present disclosure monitor the occupancy rate of the time slots in the network. When the occupancy rate of the time slots is lower than the predetermined threshold, the predetermined number of the time slots are marked as the first time slots and the rest of the time slots are marked as the second time slots. When the data communication proceeds, one of the first time slots is assigned as a dedicated time slot which is only used for the data communication. When the data communication ends, the one of the first time slots is released. Accordingly, when the occupancy rate of the network is not high, network use efficiency can be increased. The delay of a network call using data services can be reduced to provide convenience for a user.

An embodiment of the present disclosure further provides a storage medium storing computer programs. The computer programs perform the above-mentioned method for switching and controlling the call link based on the mobile terminal, when executed by a computer.

It should be noted that those skilled in the art may understand all or some of the processes in the methods of the embodiments described above can be realized by using programs to instruct corresponding hardware (e.g., a processor, a controller and so on). The programs may be stored in a computer readable storage medium. The storage medium may include read-only memory (ROM), random access memory (RAM), disk, compact disc (CD), or the like.

Figure 3:
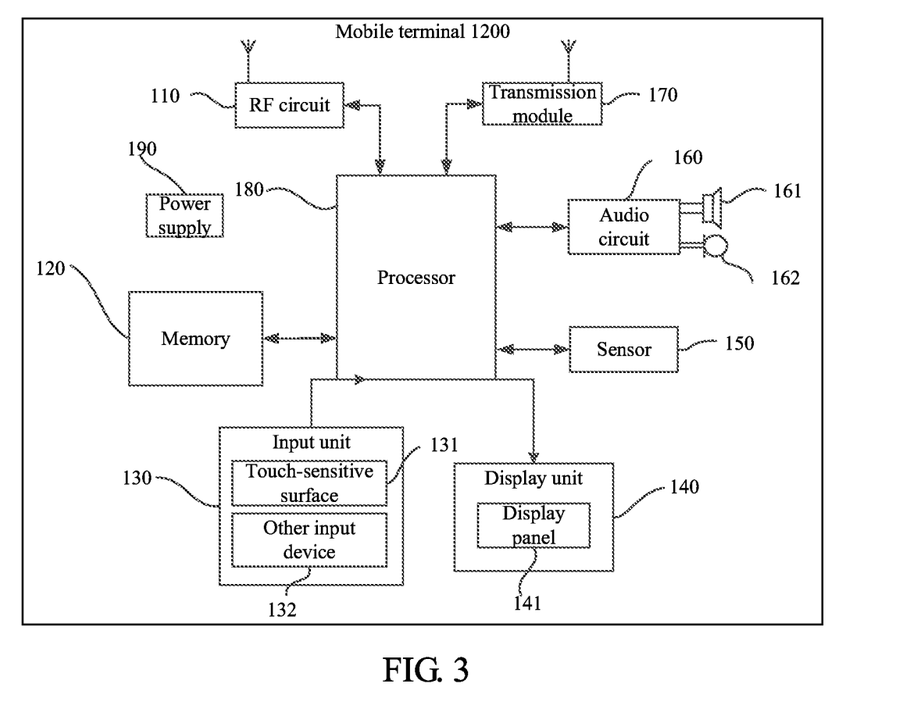
FIG. 3 illustrates a block diagram of a mobile terminal in accordance with an embodiment of the present disclosure.

FIG. 3 illustrates a block diagram of a mobile terminal in accordance with an embodiment of the present disclosure. The mobile terminal may be used to implement the method and system for automatically determining a focus of a dynamic photo based on the mobile terminal provided by the above-mentioned embodiments of the present disclosure. The mobile terminal 1200 may be a smart phone or a tablet computer.

As shown in FIG. 3, the mobile terminal 1200 may include a radio frequency (RF) circuit 110, a memory 120 including one or more computer readable storage mediums (only one is shown in FIG. 3), an input unit 130, a display unit 140, at least one sensor 150, an audio circuit 160, a transmission module 170, a processor 180 including one or more processing cores (only one is shown in FIG. 3), a power supply 190 and the like. Those skilled in the art can understand that the mobile terminal 1200 is not limited to the structure shown in FIG. 3, and may include more or fewer parts than those shown in FIG. 3, or some parts may be combined, or different arrangement of parts may be adopted.

The RF circuit 110 is configured to receive and transmit electromagnetic waves and to realize conversions of the electromagnetic waves and electrical signals, thereby communicating with a communication network or any other device. The RF circuit may include various conventional circuit elements used for performing these functions, for example, an antenna, a radio frequency transmitter, a digital signal processor, an encryption/decryption chip, a subscriber identification module (SIM) card, a memory and the like. The RF circuit 1010 may communicate with various networks, for example, an internet, an intranet or a wireless network, or may communicate with any other device via a wireless network. The above-mentioned wireless network may include a cellular telephone network, a wireless local area network or a metropolitan area network. The above-mentioned wireless network may use various communication standards, protocols and technologies and may include but not limited to, Global System of Mobile Communication (GSM), Enhanced Data GSM Environment (EDGE), Wideband Code Division Multiple Access (WCDMA), Code Division Multiple Access (CDMA), Time Division Multiple Access (TDMA), Wireless Fidelity (Wi-Fi, for example, Institute of Electrical and Electronics Engineers (IEEE) 802.11a, IEEE 802.11b, IEEE 802.11g and/or IEEE 802.11n), Voice over Internet Protocol (VoIP) Worldwide Interoperability for Microwave Access (Wi-Max), other protocols for E-mail, instant messaging and Short Messaging Service (SMS) and other suitable communication protocols, and may include protocols which are not developed currently.

The memory 120 may be configured to store software programs and software modules, for example, the program instructions/modules corresponding to the method and system for automatically determining the focus of the dynamic photo based on the mobile terminal in accordance with the above-mentioned embodiments. The processor 180 executes various functional applications and data processing by operating the software programs and the software modules stored in the memory 120, so as to implement the functions of the method and system for automatically determining the focus of the dynamic photo based on the mobile terminal. The memory 120 may include a high speed random access memory and also may include a non-volatile memory, such as one or more disk storage devices, a flash memory device or other non-volatile solid storage devices. In some embodiments, the memory 120 may further include a remote memory disposed corresponding to the processor 180. The remote memory may be connected to the mobile terminal 1200 via a network. Examples of the network include but are not limited to an internet, an intranet, a local area network, a mobile communication network and the combinations of them.

The input unit 130 may be configured to receive input number or character information and to generate keyboard, mouse, joystick, optical or trajectory ball signal inputs related to a user's setting and functional control. In detail, the input unit 130 may include a touch-sensitive surface 131 and other input device 132. The touch-sensitive surface 131, also called a touch display screen or a touch panel, may be configured to detect touch operations of a user on or near the touch-sensitive surface 131 (for example, operations carried out by the user through any suitable objects or attachments, such as a finger, a touch pen and the like, on the touch-sensitive surface 131 or near the touch control panel 1031) and to drive a corresponding device connected therewith according to a preset program. Optionally, the touch-sensitive surface 131 may include a touch detection device and a touch controller. The touch detection device detects the touch direction of the user, detects a signal caused by the touch operation and transmits the signal to the touch controller. The touch controller receives touch information from the touch detection device, converts the touch information into a contact coordinate and then transmits the contact coordinate to the processor 180 and may receive a command transmitted by the processor 180 and execute the command. Moreover, the touch-sensitive surface 131 may be one of various types, such as a resistance type, a capacitance type, an infrared type, a surface acoustic wave type and the like. Besides the touch-sensitive surface 131, the input unit 130 also may include other input device 132. In detail, other input device 132 may include, but is not limited to, one or more of a physical keyboard, function keys (such as a volume control key, a switching key and the like), a trackball, a mouse, a joystick and the like.

The display unit 140 may be configured to display information input by the user or information provided for the user and various graphical user interfaces of the mobile terminal 1200. The graphical user interfaces may be constituted by graphics, texts, icons, videos and any combinations of them. The display unit 140 may include a display panel 141. Optionally, the display panel 141 may be configured in forms of a Liquid Crystal Display (LCD), an Organic Light-Emitting Diode (OLED) and the like. Furthermore, the touch panel 131 may cover the display panel 141. When the touch-sensitive surface 131 detects a touch operation on or near it, the signal caused by the touch operation is transmitted to the processor 180 to determine the type of a touch event. Then, the processor 180 provides a corresponding visual output on the display panel 141 according to the type of the touch event. In FIG. 3, the touch-sensitive surface and the display panel 141 are served as two independent parts for accomplishing input and output functions, however, in some embodiments, the touch-sensitive surface 131 and the display panel 1041 may be integrated to accomplish the input and output functions.

The mobile terminal 1200 may further include at least one sensor 150, such as a gyroscope sensor, a magnetic induction sensor, an optical sensor, a motion sensor and other sensors. In detail, the optical sensor may include an environmental light sensor and a proximity sensor. The environmental light sensor may adjust brightness of the display panel 141 according to the lightness of environmental light. The proximity sensor may turn off the display panel 141 and/or backlight when the mobile terminal 1200 approaches an ear. As one type of the motion sensor, an accelerometer sensor may detect the value of an acceleration in each direction (generally in three axial directions), may detect the value and the direction of gravity in a static state, which may be used in posture identifying functions (such as switching between a horizontal screen and a vertical screen, switching related to a game, and calibration on the posture of a magnetometer), vibration identifying functions (such as for pedometer and striking) and the like. Furthermore, a gyroscope, a barometer, a humidity meter, a thermometer, an infrared sensor and other sensors may be integrated into the mobile terminal 1200, and explanations are not repeated herein.

The audio circuit 160, a speaker 161 and a microphone 162 may provide an audio interface between the user and the mobile terminal 1200. The audio circuit 160 may transmit an electric signal obtained by converting received audio data to the speaker 161. The electric signal is converted into a sound signal to be outputted by the speaker 161. On the other hand, the microphone 1062 converts a collected sound signal into an electric signal. The audio circuit 1060 receives the electric signal and converts the electric signal into audio data. After the audio data is outputted to the processor 180 and is processed, it is transmitted, for example, to another terminal through the RF circuit 110, or is outputted to the memory 120 in order to be further processed. The audio circuit 160 may further include an ear plug hole for providing communication between an external ear phone and the mobile terminal 1200.

The mobile terminal 1200 can help the user to receive and send E-mails, browse webpages, access streaming media and the like by the transmission module 170 (for example, a Wi-Fi module). The transmission module 170 provides wireless broadband internet access for the user. Although the transmission module 170 is shown in FIG. 4, it should be understood that the transmission module 170 is not the necessary part of the mobile terminal 1200 and may completely be omitted as required without changing the scope of the present disclosure.

The processor 180 is a control center of the mobile terminal 1200, is connected with all the parts of the whole mobile phone by various interfaces and lines and is configured to execute various functions of the mobile terminal 1200 and process the data by operating the software programs and/or the modules stored in the memory 120, and to call the data stored in the memory 120 so as to carry out integral monitoring on the mobile phone. Optionally, the processor 180 may include one or more processing cores. In some embodiments, the processor 180 may be integrated with an application processor and a modulation/demodulation processor. The application processor is mainly configured to process an operating system, at least one user interface, at least one application and the like. The modulation/demodulation processor is mainly configured to process wireless communication. It should be understood that the modulation/demodulation processor may also be not integrated into the processor 180.

The mobile terminal 1200 further includes the power supply 190 (such as a battery) for supplying power to each part. In some embodiments, the power supply may be logically connected with the processor 180 by a power supply management system, so as to implement functions of charge management, discharge management, power consumption management and the like by the power supply management system. The power supply 190 may further include one or more direct current or alternating current power supplies, recharging systems, power supply failure detection circuits, power converters or inverters, power supply status indicators and the like.

Although not shown in the FIG. 3, the mobile terminal 1200 may further include a camera (for example, a front camera or a rear camera), a BLUETOOTH module, and the like which are not further described herein. In the present embodiment, the display unit of the mobile terminal is a touch screen display, and the mobile terminal further includes a memory and one or more programs. The one or more programs are stored in the memory and configured to be executed by one or more processors. The one or more programs contain instructions for performing the following operations.

The mobile terminal monitors an occupancy rate of time slots in a network.

When the occupancy rate of the time slots is lower than a predetermined threshold, a predetermined number of the time slots are marked as first time slots and the rest of the time slots are marked as second time slots. The time slots which are marked as the first time slots are dedicated time slot used in communication between two sides.

When the data communication proceeds, one of the first time slots is assigned as the dedicated time slot which is only used for the data communication. When the data communication ends, the one of the first time slots is released.

After the operation in which when the data communication proceeds, one of the first time slots is assigned as the dedicated time slot which is only used for the data communication and the operation in which when the data communication ends, the one of the first time slots is released, the following operations are further performed. The occupancy rate of the time slots in the network is continually monitored. When the occupancy rate of the time slots is greater than or equal to the predetermined threshold, the time slots which are marked as the first time slots and occupied are correspondingly processed.

Data in the time slots which are marked as the first time slots and occupied is duplicated into the second time slots for communication.

The first time slots are released and marked as the second time slots after 2 seconds after the step in which the data in the time slots which are marked as the first time slots and occupied is duplicated into the second time slots for communication is performed.

In the mobile terminal, the operation of monitoring the occupancy rate of the time slots in the network includes setting up a timer, acquiring the time slot or slots X which have been used every 0.1 seconds, acquiring a total number Y of the time slots, and calculating the occupancy rate X/Y of the time slots in the network.

In the mobile terminal, the operation in which when the occupancy rate of the time slots is lower than the predetermined threshold, the predetermined number of the time slots are marked as the first time slots and the rest of the time slots are marked as the second time slots includes the following operations.

It is determined whether the occupancy rate of the time slots in the network is lower than the predetermined threshold.

The predetermined number of the time slots are marked as the first time slots, and the rest of the time slots are marked as the second time slots.

In the mobile terminal, the predetermined threshold is 20%.

In the mobile terminal, the predetermined number of the time slots are 20% of the total number of the time slots.

It should be understood that present disclosure is not limited to the exemplary examples. Those skilled in the art may achieve equivalent improvements or replacements according to the above description. The equivalent improvements and replacements should be considered to belong to the protection scope of the present disclosure.

What is claimed is:

1. A mobile terminal, comprising:
   at least one processor; and
   at least one memory,
   wherein the at least one memory is configured to store instructions and data, and the at least one processor is configured to execute the steps of:
   monitoring an occupancy rate of time slots in a network by the mobile terminal;
   marking a predetermined number of the time slots as first time slots and marking the rest of the time slots as second time slots, when the occupancy rate of the time slots is lower than a predetermined threshold, wherein the time slots which are marked as the first time slots are dedicated time slot used in communication between two sides;
   assigning one of the first time slots as a dedicated time slot which is only used for data communication when the data communication proceeds; releasing the one of the first time slots when the data communication ends
   monitoring the occupancy rate of the time slots in the network continually;
   when the occupancy rate of the time slots is greater than or equal to the predetermined threshold, the time slots which are marked as the first time slots and occupied are correspondingly processed as follows:
   duplicating data in the time slots which are marked as the first time slots and occupied into the second time slots for communication; and
   releasing the first time slots and marking the same as the second time slots after 2 seconds after the step of duplicating the data in the time slots which are marked as the first time slots and occupied into the second time slots for communication is performed.

2. The mobile terminal of claim 1, wherein the step of monitoring the occupancy rate of the time slots in the network by the mobile terminal comprises:
   setting up a timer;
   acquiring the time slot or slots X which have been used every 0.1 seconds;
   acquiring a total number Y of the time slots; and
   calculating the occupancy rate X/Y of the time slots in the network.

3. The mobile terminal of claim 2, wherein the step of marking the predetermined number of the time slots as the first time slots and marking the rest of the time slots as second time slots when the occupancy rate of the time slots is lower than a predetermined threshold comprises:
   determining whether the occupancy rate of the time slots in the network is lower than the predetermined threshold; and
   marking the predetermined number of the time slots as the first time slots, and marking the rest of the time slots as the second time slots.

4. The mobile terminal of claim 1, wherein the predetermined threshold is 20%.

5. The mobile terminal of claim 1, wherein the predetermined number of the time slots are 20% of a total number of the time slots.

6. A method for switching and controlling a call link based on a mobile terminal, comprising:
- monitoring an occupancy rate of time slots in a network by the mobile terminal;
- marking a predetermined number of the time slots as first time slots and marking the rest of the time slots as second time slots, when the occupancy rate of the time slots is lower than a predetermined threshold;
- assigning one of the first time slots as a dedicated time slot which is only used for data communication when the data communication proceeds; releasing the one of the first time slots when the data communication ends;
- monitoring the occupancy rate of the time slots in the network continually;
- when the occupancy rate of the time slots is greater than or equal to the predetermined threshold, the time slots which are marked as the first time slots and occupied are correspondingly processed as follows:
- duplicating data in the time slots which are marked as the first time slots and occupied into the second time slots for communication; and
- releasing the first time slots and marking the same as the second time slots after 2 seconds after the step of duplicating the data in the time slots which are marked as the first time slots and occupied into the second time slots for communication is performed.

7. The method for switching and controlling the call link based on the mobile terminal of claim 6, wherein the step of monitoring the occupancy rate of the time slots in the network by the mobile terminal comprises:
- setting up a timer;
- acquiring the time slot or slots X which have been used every 0.1 seconds;
- acquiring a total number Y of the time slots; and
- calculating the occupancy rate X/Y of the time slots in the network.

8. The method for switching and controlling the call link based on the mobile terminal of claim 7, wherein the step of marking the predetermined number of the time slots as the first time slots and marking the rest of the time slots as second time slots when the occupancy rate of the time slots is lower than a predetermined threshold comprises:
- determining whether the occupancy rate of the time slots in the network is lower than the predetermined threshold; and
- marking the predetermined number of the time slots as the first time slots, and marking the rest of the time slots as the second time slots.

9. The method for switching and controlling the call link based on the mobile terminal of claim 6, wherein the predetermined threshold is 20%.

10. The method for switching and controlling the call link based on the mobile terminal of claim 6, wherein the predetermined number of the time slots are 20% of a total number of the time slots.

* * * * *